United States Patent [19]

Farhat

[11] Patent Number: 4,825,136
[45] Date of Patent: Apr. 25, 1989

[54] MIMETIC FUNCTION SIMULATOR
[75] Inventor: Jon A. Farhat, Laguna Beach, Calif.
[73] Assignee: Exhibitronix, La Palma, Calif.
[21] Appl. No.: 935,751
[22] Filed: Nov. 28, 1986
[51] Int. Cl.[4] .............................................. A63H 3/40
[52] U.S. Cl. .................................. 318/568.1; 446/330; 446/343; 446/353
[58] Field of Search ................. 318/568; 446/337, 341, 446/343, 330, 294, 301, 300, 298, 268, 300, 303, 335, 329–331, 338, 342, 352–354, 358; 40/414, 416, 463, 411, 423, 417–420; 364/410, 513, 189

[56] References Cited

U.S. PATENT DOCUMENTS

| | | | |
|---|---|---|---|
| 1,489,385 | 4/1924 | Ciavatti | 446/341 |
| 2,641,866 | 6/1953 | Schiller | 446/337 |
| 2,711,603 | 6/1955 | Seidl | 446/343 X |
| 3,383,795 | 5/1968 | Ryan et al. | 446/337 |
| 3,662,374 | 5/1972 | Harrison, III et al. | 446/301 X |
| 3,912,694 | 10/1975 | Chiappe et al. | 446/354 X |
| 4,105,206 | 8/1978 | Soulos | 446/331 X |
| 4,139,968 | 2/1979 | Milner | 446/301 |
| 4,177,589 | 12/1979 | Villa | 40/416 X |
| 4,516,951 | 5/1985 | Saigo et al. | 446/330 X |
| 4,538,233 | 8/1985 | Resnick et al. | 364/513 |
| 4,547,170 | 10/1985 | Gurtner et al. | 446/353 |
| 4,641,251 | 2/1987 | Inoue | 364/513 |
| 4,683,669 | 8/1987 | Greer | 446/337 |

FOREIGN PATENT DOCUMENTS 0770508  3/1979  U.S.S.R. ................. 446/353

Primary Examiner—Bentsu Ro
Attorney, Agent, or Firm—Stetina and Brunda

[57] ABSTRACT

A system for regulating the movement of a model to simulate mimetic functions is disclosed. The system comprises at least one servo mechanism disposed within an interior surface of the model. The servo mechanism is connected to an interior surface of the model such that the surface moves in response to movement of the servo to stimulate mimetic movements. A power supply is connected to the servos and operative to facilitate movement of the servos in response to control signals. At least one control mechanism is connected to the servos and operative to generate control signals responsive to the desired mimetic movement to be implemented. A recording device is connectable to the control mechanism and to the servos. The recording device is operative in a first mode to receive and store the control signals from the control mechanism, and in a second mode to communicate the stored signals to the model. The stored signals are effective to regulate movement of the servos to stimulate mimetic movement.

10 Claims, 3 Drawing Sheets

MIMETIC FUNCTION SIMULATOR

BACKGROUND OF THE DISCLOSURE

The present invention relates to robotic devices and, more particularly, to robotic devices wherein electromechanical mechanisms are used to simulate a wide variety of muscle movements in the face or other portions of a model.

Robotic devices have found application in a number of different fields. The nuclear power industry, for example, uses robotic devices to enable the safe manipulation of radioactive materials. Other industries use similar devices to allow the operator to perform dangerous or difficult tasks. The mechanisms for operating such robotic devices typically include large and complex electromechanical machinery operated by sophisticated control circuits.

In the entertainment industry various techniques and types of devices have been used to animate the movements of a model. Stop action techniques typically require manual manipulation of the model in conjunction with a sequence of photographs to simulate continuous movement of the model. Such techniques are very time consuming and often produce unsatisfactory results. Though efforts have been made to provide the model with mechanisms allowing it to move in response to control signals, such mechanisms have typically suffered from a difficulty in arranging an adequate number of control devices within the framework of the model. Moreover, the reliability of such devices has been difficult to maintain.

Contemporary robotic devices used to mimic human or other characteristic movements commonly utilize pneumatic control devices that move surface portions, e.g. the facial features of the model, as a result of controlled injection or removal of air into a chamber. Thus, the movement of the mouth, head, eyes and other muscles may be simulated by controlling the air pressure to or from a given region. Though such devices may be constructed to provide generally reliable operation, they suffer from several substantial drawbacks which limit the degree of simulation that may be obtained. One principle drawback with such pneumatic devices is that the pneumatic servo mechanisms and actuators typically consume substantial amounts of space within the model and therefore the number of such mechanisms is limited, so long as the model is designed to contain all such devices. Similarly, the chamber that receives the controlled air pressure also requires space within the principle features of the model. Thus, of the fifty facial muscles that a human may manipulate to create different facial expressions, pneumatic models are typically operative to simulate movement of between five and ten of those muscles.

Though various industries have utilized electromechanical robotic devices to perform specific tasks, it is heretofore been unknown to incorporate such electromechanical mechanisms into a human or animal caricature in a way to permit the manipulation of a large number of facial features by a self-contained control mechanism as described below.

SUMMARY OF THE INVENTION

A system for regulating the movement of a model to simulate mimetic functions is disclosed. The system comprises at least one servo mechanism disposed within an interior surface of the model. The servo mechanism is connected to an interior surface of the model such that the surface moves in response to movement of the servo to stimulate mimetic movements. A power supply is connected to the servos and operative to facilitate movement of the servos in response to control signals. At least one control mechanism is connected to the servos and operative to generate control signals responsive to the desired mimetic movement to be implemented. A storage device is connectable to the control mechanism and to the servos. The storage device is operative in a first mode to receive and store the control signals from the control device, and in a second mode to communicate the stored signals to the model. The stored signals are effective to regulate movement of the servos to simulate mimetic movement.

In one implementation of the invention servos are connected to a pulley assembly including a first pulley housing connected to the servo. The pulley housing includes first and second guide apertures formed therein. Each of the guide apertures is formed to be equidistant from the pulley wheel and disposed in the same plane passing through the wheel. A second pulley housing is disposed remote from the first pulley housing, the second pulley housing having a second wheel connected thereto. A connecting cord is extended about the first and second wheels through the first and second guide apertures. A connecting member may be connected to the cord along the length thereof and secured to the interior surface of the model such that movement of the cord in response to movement of the servo affects movement of the inner surface of the model.

DETAILED DESCRIPTION OF THE INVENTION

The detailed description set forth below in connection with the appended drawings is intended merely as a description of the presently preferred embodiment of the invention, and is not intended to represent the only form in which the present invention may be constructed or utilized. The description sets forth the structure in connection with the illustrated embodiments. It is to be understood, however, that the same or similar structures are intended to be encompassed within the spirit and scope of the invention.

Figure 1:
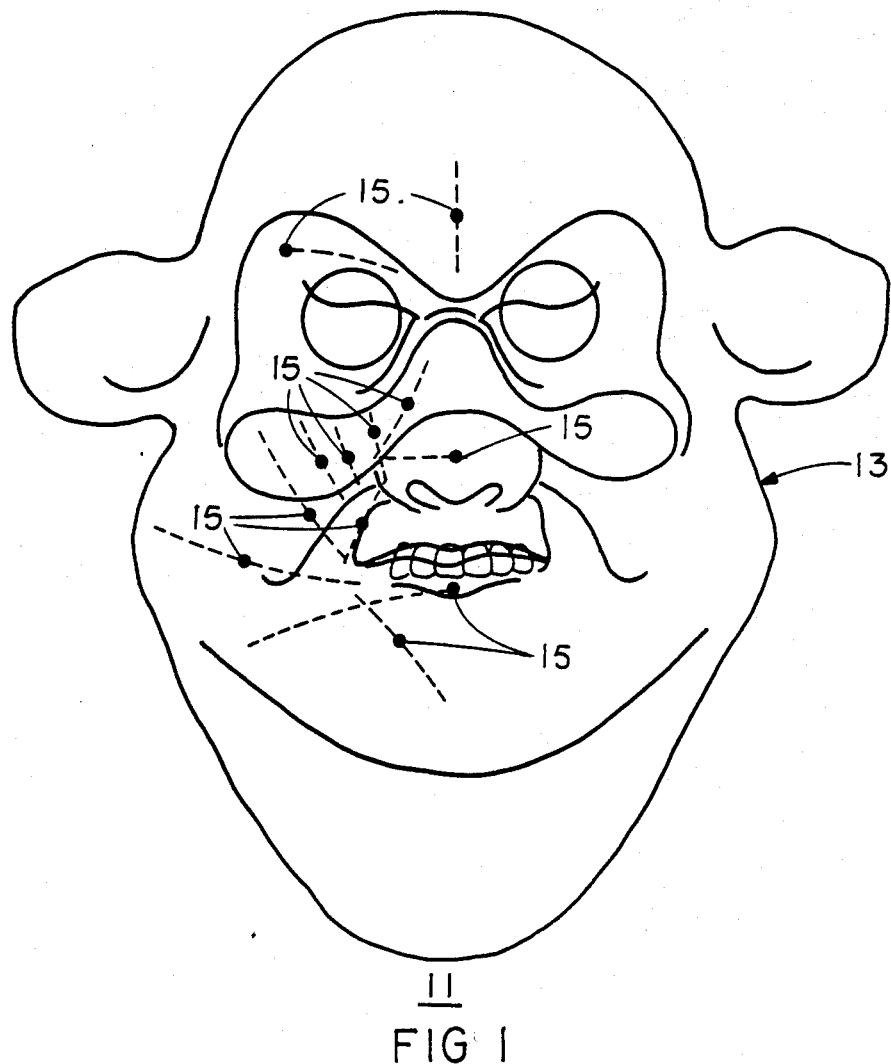
FIG. 1 is a front view of an exemplary model to be operated in accordance with the present invention.

Referring to FIG. 1 wherein there is shown a front view of the face 13 of an exemplary model 11 with control lines formed beneath the face to control movements simulating muscle movement as described below. A plurality of control cords are disposed adjacent the interior surface of the model face 13 and connected to the interior surface of the face at various locations, represented by connection points 15. The connection points 15 may be protrusions on the inner surface of face 13 which will allow that inner surface portion to a translating member attached to the cord assembly as described more fully below. The connecting points will be drawn in the direction of the dashed lines in response to the action of the attached pulley assembly. Accordingly, by pulling the interior surface of the face 13 from one or more of the connecting points in the directions generally indicated by the dashed lines various types of expressions may be simulated on the face of the model. The location of the connecting point and the direction of movement may be such as to simulate muscle patterns in a human face. The number of connecting points and the patterns of movement may be selected in accordance with the number and type of expressions desired to be simulated.

It is to be understood that the location of the illustrated connecting points and the indicated pattern of movement is not intended to be limiting, but rather is merely exemplary of the types of connections and directions of movements that may be implemented within the scope of the present invention. It is also to be understood that the means of connecting the interior surface of the model face to translating members attached to the pulley mechanism may be varied as desired. It is contemplated that in some cases the connecting points may simply be locations at which the translating member is adhered to the inner surface of the model face. It is contemplated that the connecting means may be varied in accordance with the structure and composition of the interior surface of the model face. The structure and operation of control cords used to draw the model face in the desired direction are described in more detail below.

In general, the control cords are formed as a single wire (in the case of a linear servo), or a wire loop (in the case of a rotational servo), passing through housing supporting a servo mechanism, and is connected to the servo. As the servo moves in response to control signals the cord translates, causing the surface to which the cord is attached to move in a controlled manner depending upon the path of the cord. Thus, for example, movement of control cords connected to the forehead of the model will cause the forehead to wrinkle in accordance with the degree of movement of the servo. Other control cords may be connected to control the movement of the ears, the scalp, the forehead, eyes, eyebrows, nose, lips, mouth, tongue and other features. Moreover, the above features may be moved in different directions. For example, the lips may be moved in different ways such as pursing the lips, raising the upper lip, and downward pulling of the lower lip. Additionally, movement of a plurality of features can occur cooperatively or independently by the use of different control cords or different combinations of control cords. In each case the various functions are simulated by use of control cords connected to the appropriate surface. Additional functions may be simulated by other mechanical mechanisms used to effect movements such as axial rotation of the head, lateral movement of the jaws, thrusting of the jaw, and opening and closing of the mouth. The function and operation of the mechanisms is described in more detail below.

Figure 2:
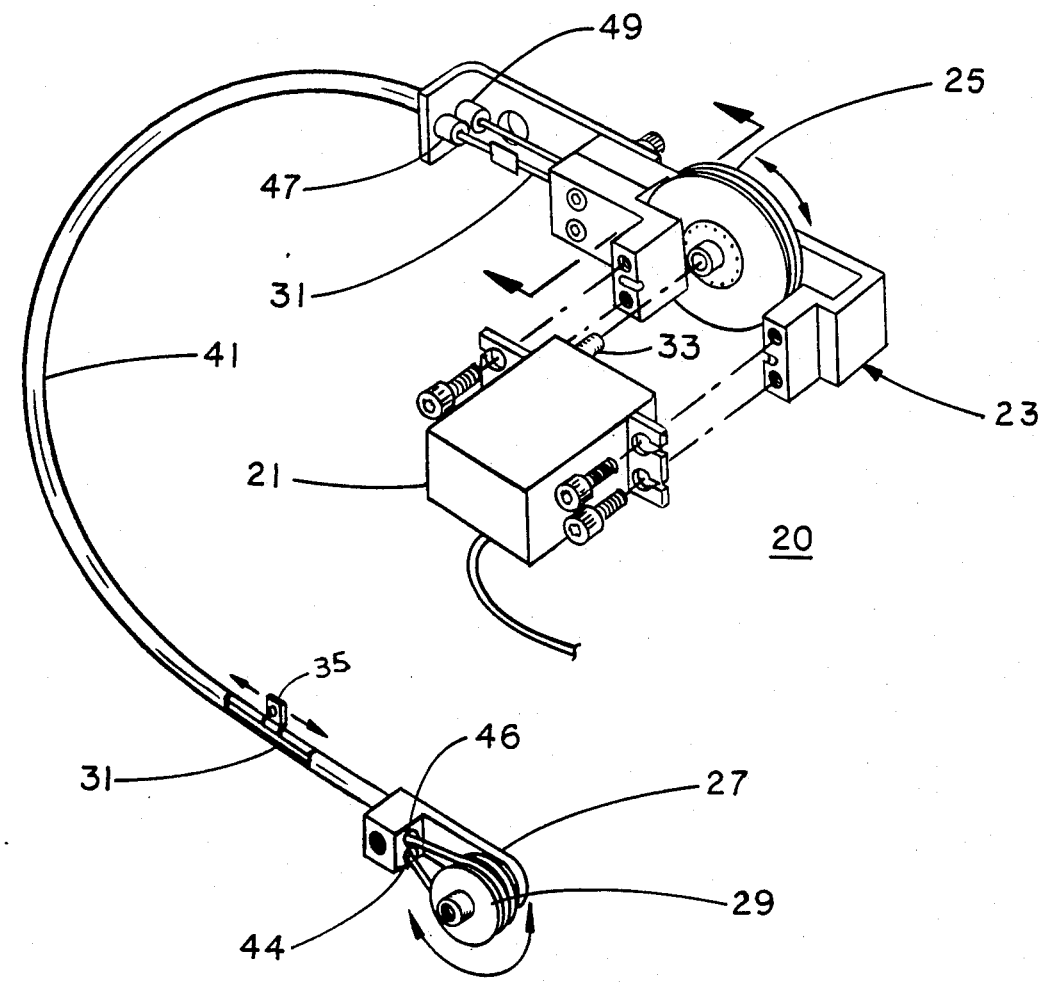
FIG. 2 is a perspective view of an exemplary cord assembly used to control the movement of various features of the model.

FIG. 2 is a perspective view of an exemplary control cord assembly 20 used to simulate movement of a large number of facial features. The control cord assembly includes servo 21, pulley housing 23, pulley 25, remote pulley housing 27, pulley 29, which collectively cause movement of cord 31 and attached connection member 35. A remote pulley housing 27 is provided with pulley 29 for receiving the cord 31 and facilitating movement of the cord. The particular servo mechanism used may be any of a variety of commercially available servos such as a Model 132H rotational servo manufactured by Futaba of Japan. Generation of control signals for controlling the movement of the servo mechanism is described in more detail below. The pulley 25 is attached to the servo mechanism 21 and rotates in response to controlled movement of stem 33 of the servo. The cord 31 is looped about the pulleys 25 and 29, and translates in response to rotation of the stem 31 such that a connecting member 35 secured to cord 31 is caused to move laterally from one location to another. Connecting member 35 is connected to the interior surface of model face 13 at one of the connecting points 15. By selecting the arrangement of the cord assembly 20 the path of the connecting member may be implemented in the desired direction.

Figure 3:
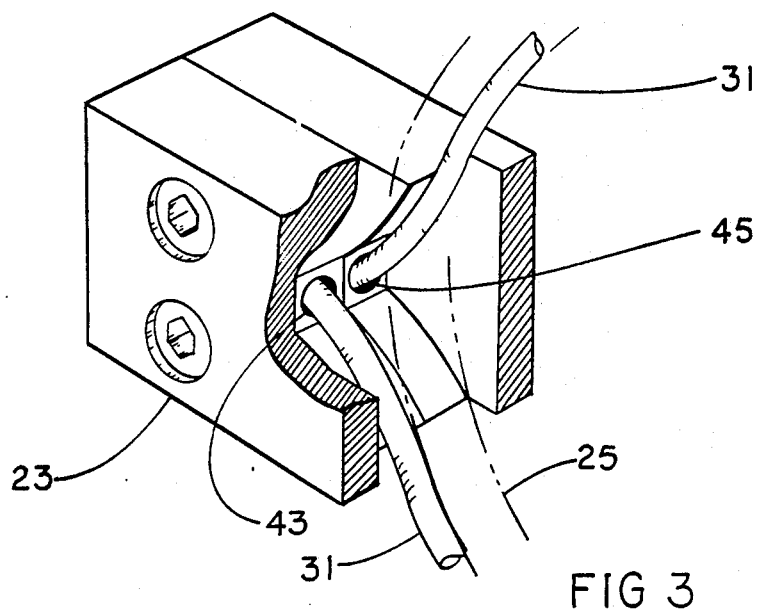
FIG. 3 illustrates a portion of the pulley housing.

The cord 31 passes around the pulley 25 and through apertures 43, 45 (shown at FIG. 3) and through apertures 47 and 49. The cord then passes through flexible covering 41 which extends towards remote pulley housing 27. The cord 31 and flexible covering 41 may be of any convenient length and are preferably of sufficient resilience and stiffness to facilitate the proper movement of connecting member 35. The connecting member 35 may disposed at any convenient position relative to the length of cord 31 without interfering with the operation of the cord.

It is anticipated that the servo 21 may also be implemented as a linear servo, such as the Model S111 linear servo manufactured by Futaba. In such case pulleys 25 and 29 may be eliminated; replaced by a spring bias mechanism, or the like, with cord 31 being implemented as a single length of cord having a connecting member 35 secured thereto at any convenient location along the length thereof. As with the rotational servo, the location of remote housing 27, if needed, may be selected based upon the available supporting surface within the model. It is further anticipated that to implement certain movements, such as eye movements, connecting member 35 may be eliminated and a second cord may be secured to pulley 29, and to a further remote control mechanism to facilitate coordinated movement of the eyes, such as that illustrated at FIG. 4 described below.

An advantage obtained by the use of rotational servos is that the pulley assembly mechanism will provide a "push-pull" mechanical force whereby segments of the cord alternately provide the tension to move the surface portion. Such a "push-pull" arrangement has been found to provide superior control capability to regulate movement of the surfaces. However, to provide the greatest control in the rotational servo implementation the cord and pulley movement is preferably configured to avoid bowing or binding of the cord. It has been determined that proper movement of the cord is effected where both sides of the cord are maintained in proper relative position with respect to the servo housing and the return block. It has been found that in the rotational servo embodiment the distance between the pulley 25 and the apertures 43, 45 formed in the housing should remain constant. Moreover, apertures 43 and 45 are preferably centered with respect to the pulley 25, i.e. the apertures are equidistant from the pulley 25. Apertures 47 and 49 are similarly disposed with respect to pulley 25. Apertures 44 and 46 are also similarly disposed with respect to pulley 29. Apertures 43, 45 and 47, 49 are further disposed one atop the other so as to be bisected by a common vertical plane passing through the center of the pulley wheel.

As described above the cord assemblies may be interposed at various locations throughout the features of the model. Certain features may be effected by the use of a single cord assembly connected to the inner surface of the model skin, whereas other features may require a plurality of cord assemblies to effectively simulate the movement of the muscles. Where a plurality of cord assemblies are used to simulate the movement of a single muscle the cord assemblies may be operated in unison or separately in order to effect the desired simulation.

Figure 4:
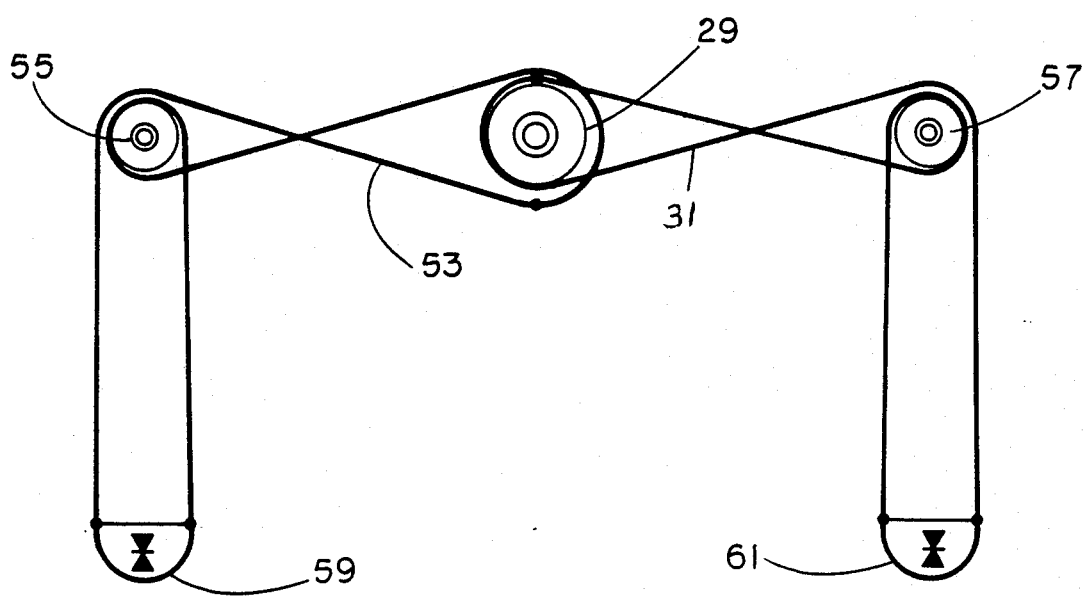
FIG. 4 illustrates a mechanism useful to control eye movement of the model.

FIG. 4 illustrates an exemplary eye movement control mechanism that may be implemented within the scope of the present invention. FIG. 4 represents a top view of one exemplary design illustrating the connections between a pulley, as shown in the previous figures, and the control mechanisms used to control the motion of the eyes of the model. The eyes are formed to move laterally about a pivot point in response to tension applied to connecting points along the exterior of the eyes. Cords are connected to two connecting points on each eye, wound about pulleys associated with each eye, and about the central pulley connected to the rotary servo.

As the central pulley is caused to rotate in response to motion of the servo, the cord wound about the central pulley pulls the eyes in a coordinated manner in the desired direction. As the central pulley is rotated in the opposite direction the eyes are urged or turned to their original position.

As shown at FIG. 4 the cord 31, 53 passes about pulley 29, which also receives cord 31 as shown at FIG. 2. As cord 31 moves in response to action of the servo 21, cord 53 also moves. Cord 53 is connected to outer side portions of the eyes 59, 61 and is looped about a pair of rollers 55, 57. As the servo device rotates in response to control signals the cord 53 is caused to translate such that the eyes 59, 61 are both caused to move in the desired left or right direction. In the presently preferred embodiment it has been determined that eye movement is most reliably obtained where the cords are connected to the eye at points along the same diameter through the eye center. Thus, binding problems are reduced and eye movement is most easily obtained. Though the assembly illustrated at FIG. 4 depicts a mechanism for moving both eyes left and right in unison and to the same degree, it is anticipated that alternative assemblies may be utilized within the scope of the present invention wherein left and right eyes may be moved independently.

In the presently preferred embodiment the upward and downward movement of each eye is controlled by a separate servo mechanism (not shown) connected to the eye at opposite points along a substantially vertical line forming a diameter of the eye. As each servo is operated the attached pulley is caused to rotate, causing the eye to move in an upward or downward fashion as desired. It is anticipated that alternative embodiments may be implemented where a single servo mechanism is operative to regulate the upward or downward movement of both eyes in unison, as described in connection with lateral eye movements.

Figure 5:
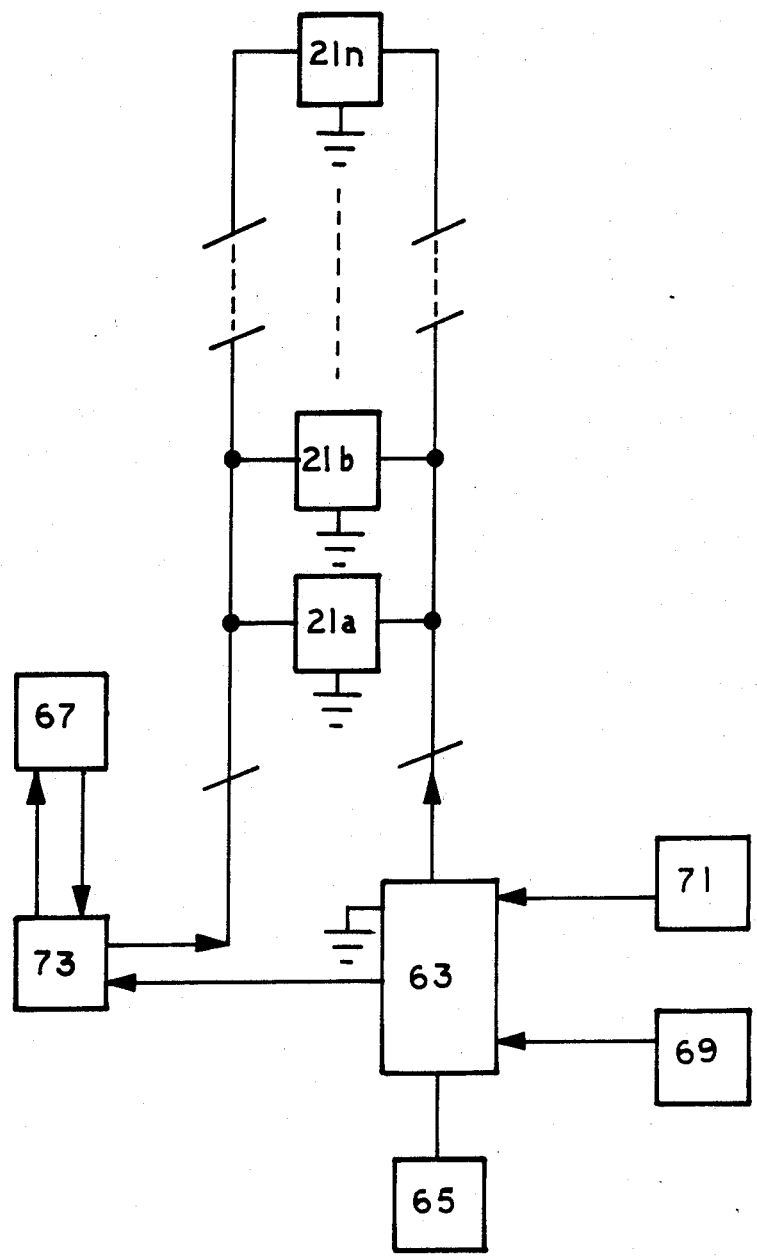
FIG. 5 is a schematic diagram of an exemplary circuit used to regulate the motion of the servos.

Having described the mechanical structure of the invention, the electrical control of the invention now described with reference to FIG. 5 of the drawings. Each of the servo mechanisms $21a-21n$ is preferably connected to a controller 63 disposed within or near the model. The controller 63, which may be formed to comprise multiplexer circuitry is operative to selectively power servo mechanisms $21a-21n$ in response to signals received from either a manual control mechanism 65 or from another source, such as a taped program device 67.

The manual control mechanism 65 which may be implemented as a keyboard or the like, may include a separate key for each of the servo mechanisms. However, in the presently preferred embodiment the operation of a plurality of servo mechanisms, e.g. to control the movement of the forehead, is effected by a single key. Movement of the manual control mechanism 65 is detected by the controller 63 which then powers the respective servo mechanism(s) in accordance with the degree of movement of the manual control mechanism by the user. Power is provided by power supply 71.

The controller 63 is preferably implemented such that the control input signals from the user may be communicated to both the robotic device and the external recording device such as recording device 67, via interface 73. Consequently, a record of the control signals communicated to the servo mechanisms may be created and later played back by recording device 67 to implement the same movements as effected by those control signals. In practice, the recording device 67 may be implemented as an analog or digital recording device and editor. Accordingly, the user may construct a particular pattern of movements and have that pattern recorded such that the device may be caused to operate in the same pattern when the recording device 67 is operated in a playback mode.

In the presently preferred embodiment the controller 63 is operative to feed signals to a recording device such as a cassette recorder which records the signals representative of the desired movement on magnetic tape. When the control box is in a playback mode the tape recorder may be played, causing the model to implement the same motions. It is anticipated that once the desired sequence of motions is recorded on tape the model may be utilized without being connected to a control box or manual control mechanism. Thus, commercial embodiments of the invention may be sold which simply incorporate cassette recorders, into which may be inserted prerecorded tapes of desired control signals.

In still another anticipated embodiment the model may be adapted to receive control signals from a telephone modem 69 or a personal computer, or even from a television receiver. Interpretation of such received signals to extract control information may be effected by any of a variety of well known means. Once the received information has been so translated to control signals the servos will operate to implement the desired sequence of movement as will be understood to those of ordinary skill in the art.

As discussed above various of the functions and features of the invention may be implemented in a variety of ways without departing from the spirit or scope of the invention. The precise number of control features and the particular manner in which the cord assembly and other control mechanisms are connected to the skin of the model may be varied in accordance with the particular application. Moreover, the same techniques and general construction may be used to implement motion of other features of the model such as arms or hands.

What is claimed is:

1. A system for regulating movement of a model to simulate mimetic functions comprising:
   a plurality of electromechanical rotational servo mechanism, each operable to rotate in first and second directions and disposed within an interior surface of the model said servo mechanisms incorporating first and second pulley assemblies having a flexible connecting cord non-linearly looped thereabout, said connecting cord being attached to an inner surface of the model at a point intermediate said first and second pulley assemblies such that the surface of the model will move in response to movement of the connecting cord thereby simulating a desired mimetic movement, said mechanism cord cooperating with said servo mechanism to apply a bi-directional force to the attached point on the model inner surface, the direction of said force being responsive to the direction of rotation of said servo mechanism; and
   at least one control mechanism connected to said servo mechanisms and operative to generate control signals responsive to the desired mimetic movement to be implemented.

2. The system as recited in claim 1 further comprising:
   a recording device in electrical communication with said servo mechanisms recording device being operative in a first mode to receive and store said control signals from said control mechanism, and in a second mode to communicate the stored signals to said servo mechanisms said stored signals being effective to regulate movement of said servo mechanisms to simulate the mimetic movement.

3. The system as recited in claim 2 wherein the recording device comprises a tape recorder.

4. The system as recited in claim 3 wherein said tape recorder is operative to play prerecorded tapes, said prerecorded tapes having information stored thereon, said information being effective to regulate movement of the servo mechanisms to simulate the mimetic movement of the model.

5. The system as recited in claim 1 wherein said control mechanism comprises a keyboard.

6. The system as recited in claim 5 wherein said keyboard comprises a plurality of keys, at least one of said keys being operative to activate a multiplicity of servo mechanisms, said multiplicity of servo mechanisms being grouped to cooperatively simulate the desired mimetic movement.

7. The system as recited in claim 1 wherein said control mechanism is connectable to a modem to receive control signals from a remote source, said received control signals being representative to the desired mimetic movement to be implemented.

8. The system as recited in claim 1 wherein said first pulley assembly comprising a first pulley housing connected to said servo mechanisms and a first pulley wheel, said first pulley housing having first and second guide apertures formed therein, said first and second guide apertures being equidistant from said first pulley wheel and are bisected by a common plane passing through the center of said first pulley wheel;
   said second pulley assembly comprising
   a second pulley housing disposed remote from said first pulley housing, said second pulley housing having a second pulley wheel connected thereto;
   said connecting cord extending about said first and second pulley wheels and through said first and second guide apertures; and
   a connecting member connected to said connecting cord along the length thereof and to said interior surface of the model such that movement of said connecting cord in response to movement of said servo mechanism effects movement of the interior surface of the model.

9. The system as recited in claim 1 further including an eye control mechanism, said eye control mechanism comprising:
   a pair of eyes, each of said eyes being formed to rotate about a pivot axis, each of said eyes further having connecting points disposed along an outer surface of the eyes on opposite sides of the pivot axis;
   a pair of eye control pulleys, each of said eye control pulleys being disposed orthogonal to one of said eyes and a central pulley; and
   eye control cord connected to said eye connecting points and extending about said eye control pulleys and said central pulley, such that said eyes are caused to rotate in response to rotation of said central pulley.

10. The system of claim 1 wherein said control mechanism is operative to cause said desired mimetic movements of varying distance at a single point on said model surface.

* * * * *